United States Patent
Kappelmann et al.

(10) Patent No.: US 9,612,166 B2
(45) Date of Patent: Apr. 4, 2017

(54) METHOD AND DEVICE FOR DETERMINING A TEMPERATURE OF A SHEATHED-ELEMENT GLOW PLUG DURING OPERATION IN AN INTERNAL COMBUSTION ENGINE

(75) Inventors: Peter Kappelmann, Stuttgart (DE); Bernd Rapp, Schwieberdingen (DE); Sascha Joos, Dresden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 644 days.

(21) Appl. No.: 14/114,489

(22) PCT Filed: Apr. 18, 2012

(86) PCT No.: PCT/EP2012/057041
§ 371 (c)(1),
(2), (4) Date: Jan. 13, 2014

(87) PCT Pub. No.: WO2012/146513
PCT Pub. Date: Nov. 1, 2012

(65) Prior Publication Data
US 2014/0126605 A1    May 8, 2014

(30) Foreign Application Priority Data

Apr. 29, 2011   (DE) .................... 10 2011 017 814

(51) Int. Cl.
*G01K 15/00*   (2006.01)
*F02P 19/02*   (2006.01)

(52) U.S. Cl.
CPC .......... *G01K 15/005* (2013.01); *F02P 19/025* (2013.01); *F02P 19/023* (2013.01)

(58) Field of Classification Search
None
See application file for complete search history.

(56) References Cited

U.S. PATENT DOCUMENTS

| 4,934,349 A | 6/1990 | Demizu |
| 2009/0194070 A1* | 8/2009 | Dittus ............ F02B 77/08 123/406.55 |
| 2011/0000901 A1* | 1/2011 | Bauer ............ F02P 19/025 219/494 |

FOREIGN PATENT DOCUMENTS

| DE | 3811816 | 11/1988 |
| DE | 102007058697 | 7/2008 |

(Continued)

OTHER PUBLICATIONS

International Search Report for PCT/EP2012/057041, issued on Jul. 26, 2012.

*Primary Examiner* — Erica Lin
(74) *Attorney, Agent, or Firm* — Norton Rose Fulbright US LLP (57) ABSTRACT

A method for determining the temperature of a sheathed-element glow plug during operation in an internal combustion engine is described, in which a temperature-resistance reference correlation is determined. In order to reduce the tolerance range of a sheathed-element glow plug, after the sheathed-element glow plug has been installed in the internal combustion engine, a calibration step is carried out in which, with the aid of the temperature-resistance reference correlation determined prior to the installation of the sheathed-element glow plug in the internal combustion engine, a temperature-resistance correlation specific to the sheathed-element glow plug is ascertained, from which the temperature of the sheathed-element glow plug during operation of the sheathed-element glow plug in the internal combustion engine is determined.

13 Claims, 4 Drawing Sheets

(56) References Cited

FOREIGN PATENT DOCUMENTS

| | | |
|---|---|---|
| DE | 102008040971 | 2/2010 |
| DE | 102010033492 | 2/2011 |
| EP | 0315934 | 5/1989 |
| EP | 2128429 | 12/2009 |
| JP | S 63-266172 | 11/1988 |
| JP | 2009-287496 | 12/2009 |
| JP | 2010-065661 | 3/2010 |

* cited by examiner

METHOD AND DEVICE FOR DETERMINING A TEMPERATURE OF A SHEATHED-ELEMENT GLOW PLUG DURING OPERATION IN AN INTERNAL COMBUSTION ENGINE

FIELD OF THE INVENTION

The present invention relates to a method for determining the temperature of a sheathed-element glow plug during operation in an internal combustion engine, whereby a temperature-resistance reference correlation is determined, as well as a device for carrying out the method.

BACKGROUND INFORMATION

From the standpoint of production engineering, sheathed-element glow plugs which are used in an internal combustion engine have a predefined tolerance of the temperature to be set at the sheathed-element glow plug for a nominal voltage. Thus, for example, for a ceramic sheathed-element glow plug, given a nominal voltage of 7 volts with which the sheathed-element glow plug is activated, a temperature of 1,200° C. is indicated as glow temperature, which allows a tolerance of +/−50 K. This means that the maximum temperature of the sheathed-element glow plug is not allowed to exceed 1,250° C. If control units which activate the sheathed-element glow plugs in the internal combustion engine are applied, then it there can be deviations with respect to the desired temperature of 1,200° C., for example. Since the control unit is unable to react to changing tolerances during operation of the sheathed-element glow plugs in the internal combustion engine, the maximum sheathed-element glow plug temperature of 1,200° C. is predefined definitively in the control unit.

German Published Patent Application No. 10 2008 040 971 describes a method and a device for regulating the temperature of sheathed-element glow plugs in an internal combustion engine, in which during a reference operation of the internal combustion engine, a mathematical correlation is formed between measured temperatures and measured resistances of at least one sheathed-element glow plug, the resistances being obtained from an actually applied voltage and an actual current flow at this sheathed-element glow plug, and this mathematical correlation being adapted dynamically over the entire service life of the plug and being utilized in the overall operation of the internal combustion engine. In this method, for improved application quality, the changing operating conditions of the internal combustion engine are taken into account. This hampers the application of the control unit for the installed sheathed-element glow plug, since great tolerances are considered during use of the sheathed-element glow plug in the internal combustion engine.

SUMMARY

Therefore, an object of the present invention is to indicate a method for determining a temperature of a sheathed-element glow plug during operation in an internal combustion engine, in which the actual tolerances of the sheathed-element glow plug are taken into account in the application of control units which activate the sheathed-element glow plug during operation of the internal combustion engine.

The object is achieved according to the present invention in that, after the sheathed-element glow plug has been installed in the internal combustion engine, a calibration step is carried out in which, with the aid of the temperature-resistance reference correlation determined prior to installing the sheathed-element glow plug in the internal combustion engine, a temperature-resistance correlation specific to the sheathed-element glow plug is ascertained, from which the temperature of the sheathed-element glow plug during operation of the sheathed-element glow plug in the internal combustion engine is determined. This has the advantage that a higher maximum temperature of the sheathed-element glow plug may be applied in the control unit. Due to the higher plug temperature to be applied in the control unit, better starting performance and/or quieter idling of the internal combustion engine is/are attained. Moreover, a reduction in the emissions of the internal combustion engine is possible.

In one especially simple and cost-neutral specific embodiment, upon applying a first voltage to the sheathed-element glow plug during the calibration step, a first resistance of the sheathed-element glow plug is ascertained, to which a first temperature from the temperature-resistance reference correlation is assigned, the temperature-resistance correlation specific to the sheathed-element glow plug being formed from this first temperature-resistance value pair. The actual temperature of the sheathed-element glow plug is thereby ascertained without direct temperature measurement, which reduces the measurement set-up at the sheathed-element glow plugs.

Advantageously, upon applying a second voltage to the same sheathed-element glow plug, a second resistance is measured, to which a second temperature from a second temperature-resistance reference correlation is assigned, and from the first value pair of the first measured resistance and the assigned first temperature thus determined, as well as the second value pair of the second measured resistance and the assigned second temperature, the temperature-resistance correlation specific to the sheathed-element glow plug is formed. Because of the availability of two temperature-resistance value pairs, the temperature-resistance correlation specific to the sheathed-element glow plug may be ascertained easily in the form of a straight line, which allows reliable determination of the actual operating temperature of the sheathed-element glow plug, resulting in reliable open-loop or closed-loop control of the sheathed-element glow plug during further processing within the control unit.

In one development, the temperature-resistance reference correlation is determined as a mean value over a sheathed-element glow plug resistance from a plurality of sheathed-element glow plugs of one type of sheathed-element glow plug which have different manufacturing tolerances, after their manufacture. Due to the evaluation of the temperature-resistance values of a multitude of sheathed-element glow plugs of one type of sheathed-element glow plug of a production lot, especially high reliability is ensured in determining the tolerance band of the temperature-resistance correlation individual to the sheathed-element glow plug, based on the known mean values. It is possible to dispense with reference measurements during the operation of the sheathed-element glow plugs in the internal combustion engine, which means disadvantageous influencing of the temperature-resistance reference correlation by the instantaneous operating state of the internal combustion engine is also eliminated.

In one variant, the temperature-resistance reference correlation is formed as a reference characteristic curve, preferably a reference straight line, which is provided with a tolerance band that has the same gradient as the reference characteristic curve. The scatter of the temperature of the sheathed-element glow plug around this reference characteristic curve, formed as a mean-value curve, as a function of the resistance of the sheathed-element glow plug is less than when using the values of +/−50 K indicated in the technical customer documentation. The tolerance for each sheathed-element glow plug is thereby reduced. If a nominal voltage is applied to the sheathed-element glow plug and the resistance is measured, then with the aid of the reference characteristic curve, a temperature is able to be determined which has a smaller tolerance.

In a further refinement, the reference characteristic curve is ascertained one time for each type of sheathed-element glow plug and stored. In this instance, the tolerance of the reference characteristic curve is a function only of the type of sheathed-element glow plug. It is thus possible to dispense with a consideration of the operational sequences of the internal combustion engine in the tolerance determination for each individual sheathed-element glow plug, which can only be determined upon use of the sheathed-element glow plug in the internal combustion engine. In this manner, not only is the method of calibrating the sheathed-element glow plug simplified, but also the accuracy in determining the actual operating temperature of the sheathed-element glow plug is improved. The tolerance range at the maximum temperature which the sheathed-element glow plug is allowed to have is thus restricted, and a higher maximum temperature of the sheathed-element glow plug may be applied in the control unit. Moreover, the temperature-resistance reference correlation, ascertained only one time, is used for all sheathed-element glow plugs of the same production lot. The need to ascertain individual references for each sheathed-element glow plug is eliminated.

Advantageously, the first calibration step of the sheathed-element glow plugs is carried out in an end-of-line production of a motor vehicle. This ensures that the sheathed-element glow plugs installed in the internal combustion engine are already calibrated upon initial start-up of the vehicle.

In a further specific embodiment, the calibration step for determining the temperature-resistance correlation specific to the sheathed-element glow plug is carried out in an after-run phase of a control unit controlling the internal combustion engine in open loop and/or closed loop. Since defined and reproducible engine operating states are still present in the after-run phase of the control unit, a highly precise calibration may thus be carried out, since it is possible to fall back upon the internal-combustion-engine operating states at hand.

Advantageously, the calibration step for determining the temperature-resistance correlation specific to the sheathed-element glow plug is repeated a multiple number of times. Due to the repeated calibration measurement during the service life of the sheathed-element glow plug in the internal combustion engine, the signs of aging on the sheathed-element glow plug are taken into account in the temperature-resistance correlation specific to the sheathed-element glow plug, and thus the accuracy in determining the actual glow temperature of the sheathed-element glow plug is increased.

In order to consider the aging process of the sheathed-element glow plug over its service life, the frequency with which the calibration step for determining the temperature-resistance correlation specific to the sheathed-element glow plug is repeated is a function of a number of glowings which have taken place and/or the glow intensities and/or the glow durations of the sheathed-element glow plug. Consequently, the accuracy of the calibration during use in the internal combustion engine is improved by a repeated adjustment of the sheathed-element glow plug.

Alternatively, the temperature-resistance correlation individual to the sheathed-element glow plug is determined after a replacement of the sheathed-element glow plug. In this case, it is ensured that the actual temperature of the sheathed-element glow plug is always taken as the basis for the subsequent open-loop and/or closed-loop control process of the sheathed-element glow plug.

In order to obtain reliable and representative resistance values of the sheathed-element glow plug, the first and second resistance are measured after the formation of a steady temperature profile within the sheathed-element glow plug, after applying the first and second voltage, respectively. This ensures that prior to the measurement, the sheathed-element glow plug is uniformly aglow, and no unsteady temperature distribution will falsify the measuring operation.

A further refinement of the present invention relates to a device for determining the temperature of a sheathed-element glow plug during operation in an internal combustion engine, including a processing unit which is connected to a memory unit, a temperature-resistance reference correlation being stored in the memory unit. In order to reduce the tolerance range of the maximum permissible temperature of the sheathed-element glow plug in the application within a control unit, after the insertion of the sheathed-element glow plug into the internal combustion engine, the processing unit carries out a calibration step in which, with the aid of the temperature-resistance reference correlation determined prior to inserting the sheathed-element glow plug into the internal combustion engine, a temperature-resistance correlation specific to the sheathed-element glow plug is ascertained, and from the temperature-resistance correlation specific to the sheathed-element glow plug and stored in the memory unit, the processing unit determines the temperature of the sheathed-element glow plug during operation of the sheathed-element glow plug in the internal combustion engine. This has the advantage that a higher maximum temperature of the sheathed-element glow plug may be applied in the control unit. Due to the higher temperature of the sheathed element glow plug to be applied in the control unit, better starting performance and/or quieter idling of the internal combustion engine is/are attained. Moreover, a reduction in the emissions of the internal combustion engine is possible.

Advantageously, the processing unit applying a first voltage to the sheathed-element glow plug is connected to a current sensor that transmits a first current signal to the processing unit, which determines a first resistance value from this first current signal and assigns to this first resistance value a first temperature value from the stored temperature-resistance reference correlation, and subsequently applies a second voltage to the sheathed-element glow plug, the current sensor sending to the processing unit a second current signal, from which the processing unit ascertains a second resistance value, to which a second temperature value from the temperature-resistance reference correlation is assigned, the processing unit determining the temperature-resistance correlation specific to the sheathed-element glow plug from the first temperature-resistance value pair and the second temperature-resistance value pair. Thus, the temperature-resistance correlation specific to the sheathed-element glow plug is determined using hardware normally present, thereby permitting a cost-effective method. Because of the availability of two temperature-resistance value pairs, the temperature-resistance correlation specific to the sheathed-element glow plug may be ascertained easily in the form of a straight line, which ensures a reliable control of the sheathed-element glow plug in open loop or closed loop during the further processing within the control unit. In this context, a reliable determination of the actual operating temperature of the sheathed-element glow plug is carried out.

DETAILED DESCRIPTION

At ambient temperatures of <40° C., cold combustion engines, especially diesel engines, need a starting aid to ignite the fuel/air mixture fed into the internal combustion engine. Glow systems are used as starting aid, which are made up of sheathed-element glow plugs, a glow-time controller and glow software which is stored in an engine control unit or the glow-time controller. In addition, glow systems are also used to improve the emissions of the vehicle. Further application areas of the glow system lie in the burner exhaust system, the auxiliary heater, the preheating of fuel or the preheating of the coolant.

Figure 1:
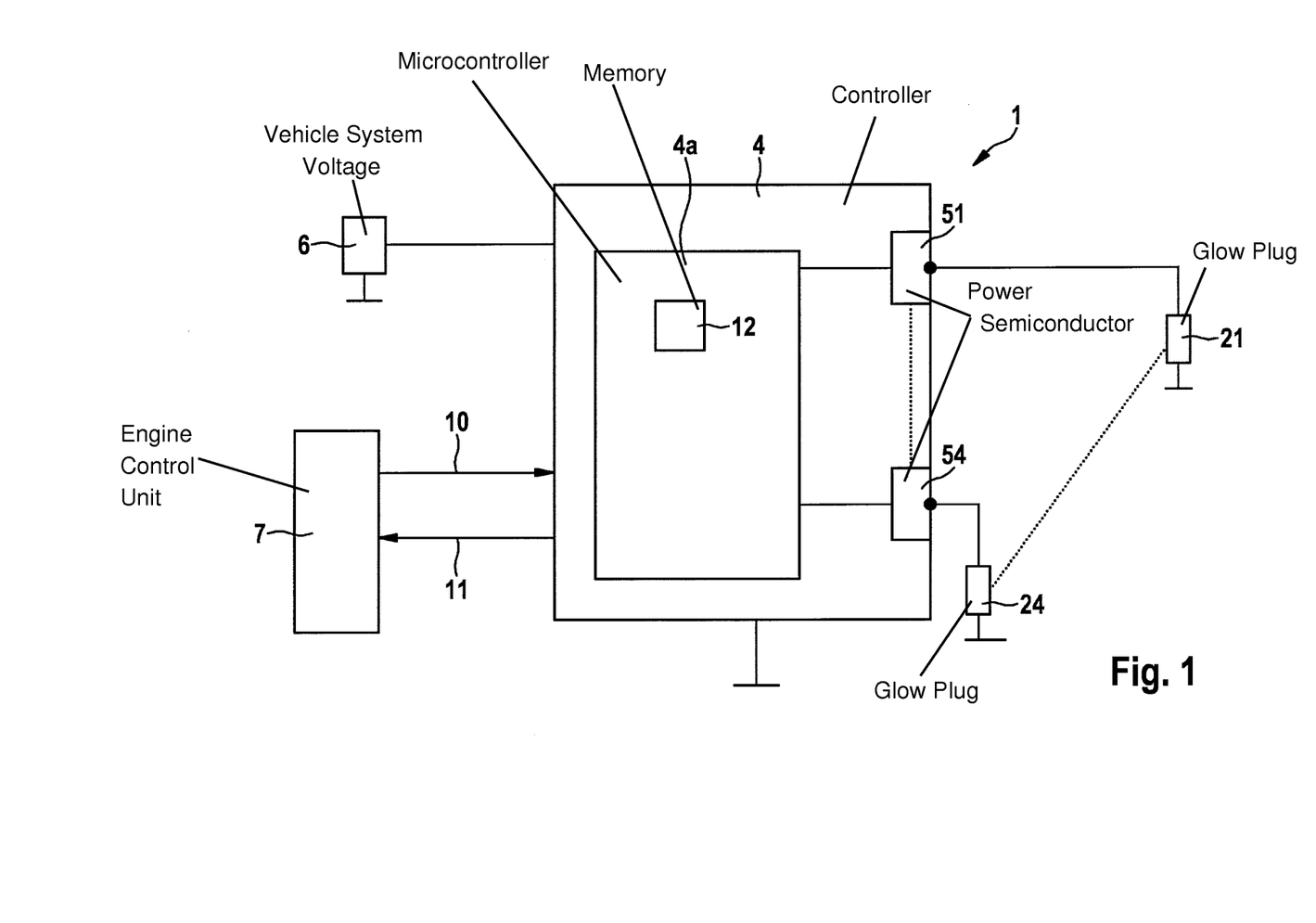
FIG. 1 shows a schematic diagram of a glow system in a motor vehicle.

FIG. 1 shows such a glow system, in which a plurality of sheathed-element glow plugs 21 through 24 are present, each sheathed-element glow plug 21 through 24 extending into a respective cylinder (not further shown) of a combustion chamber of the internal combustion engine. Sheathed-element glow plugs 21 through 24 are identical and represent customary low-voltage sheathed-element glow plugs. For the sake of simplicity, in FIG. 1, sheathed-element glow plugs 21 through 24 are represented as equivalent resistance, which are connected to ground 3 of the internal combustion engine.

Sheathed-element glow plugs 21 through 24 are connected to a glow-time controller 4, which has a power semiconductor 51 through 54 for each sheathed-element glow plug 21 through 24. Glow-time controller 4 includes a microcontroller 4a for processing incoming and outgoing signals. Furthermore, a vehicle system voltage 6 is connected to glow-time controller 4 and supplies sheathed-element glow plugs 21 through 24 with the necessary nominal voltage via power semiconductors 51 through 54. Glow-time controller 4 is connected to an engine control unit 7, which in turn is connected to the internal combustion engine (not further shown). Engine control unit 7 and glow-time controller 4 have an interface. This interface may be made both of a single-wire and a two-wire connection 10, 11. Data is exchanged between engine control unit 7 and glow-time controller 4 via this interface, both the driving of glow-time controller 4 and the diagnostic communication taking place via it.

Glow-time controller 4 outputs a pulse-width-modulated output signal (PWM signal) via power semiconductors 51 through 54 to sheathed-element glow plugs 21 through 24, the signal setting the sheathed-element-glow-plug control voltage necessary at respective sheathed-element glow plugs 21 through 24. By the selection of the make-to-break ratio (i.e., the ratio of make times to break times of the PWM signal), the desired effective voltage at the glow plug (sheathed-element-glow-plug control voltage) is able to be realized, taking the voltage which is switched through by the PWM signal into account. At the same time, the available battery voltage of the motor vehicle may also be considered. Glow-time controller 4 includes a memory unit 12. Power semiconductors 51 through 54, assigned to sheathed-element glow plugs 21 through 24, which advantageously are in the form of smart field-effect transistors and which generate a PWM signal and at the same time measure the current, are used to measure the current flowing through each sheathed-element glow plug 21 through 24, which is supplied to microcontroller 4a. From that, microcontroller 4a determines the corresponding resistance value of sheathed-element glow plugs 21 through 24. Alternatively, instead of a smart field-effect transistor, a MOSFET and a shunt may also be used.

To now ensure precise activation by glow-time controller 4 for an individual sheathed-element glow plug 21, 22, 23, 24, the maximum glow temperature present at each sheathed-element glow plug 21 through 24 during operation in the internal combustion engine is ascertained. In so doing, in a first step, all sheathed-element glow plugs of a production lot of one type of sheathed-element glow plug are evaluated after production. For each individual sheathed-element glow plug, a nominal voltage is applied to each sheathed-element glow plug at the end of line of the sheathed-element glow plug manufacture. After a certain time, the current and the temperature of the sheathed-element glow plug are ascertained. The resistance is ascertained from the measured current. Sheathed-element glow plugs which do not lie within the tolerance are sorted out.

Figure 2:
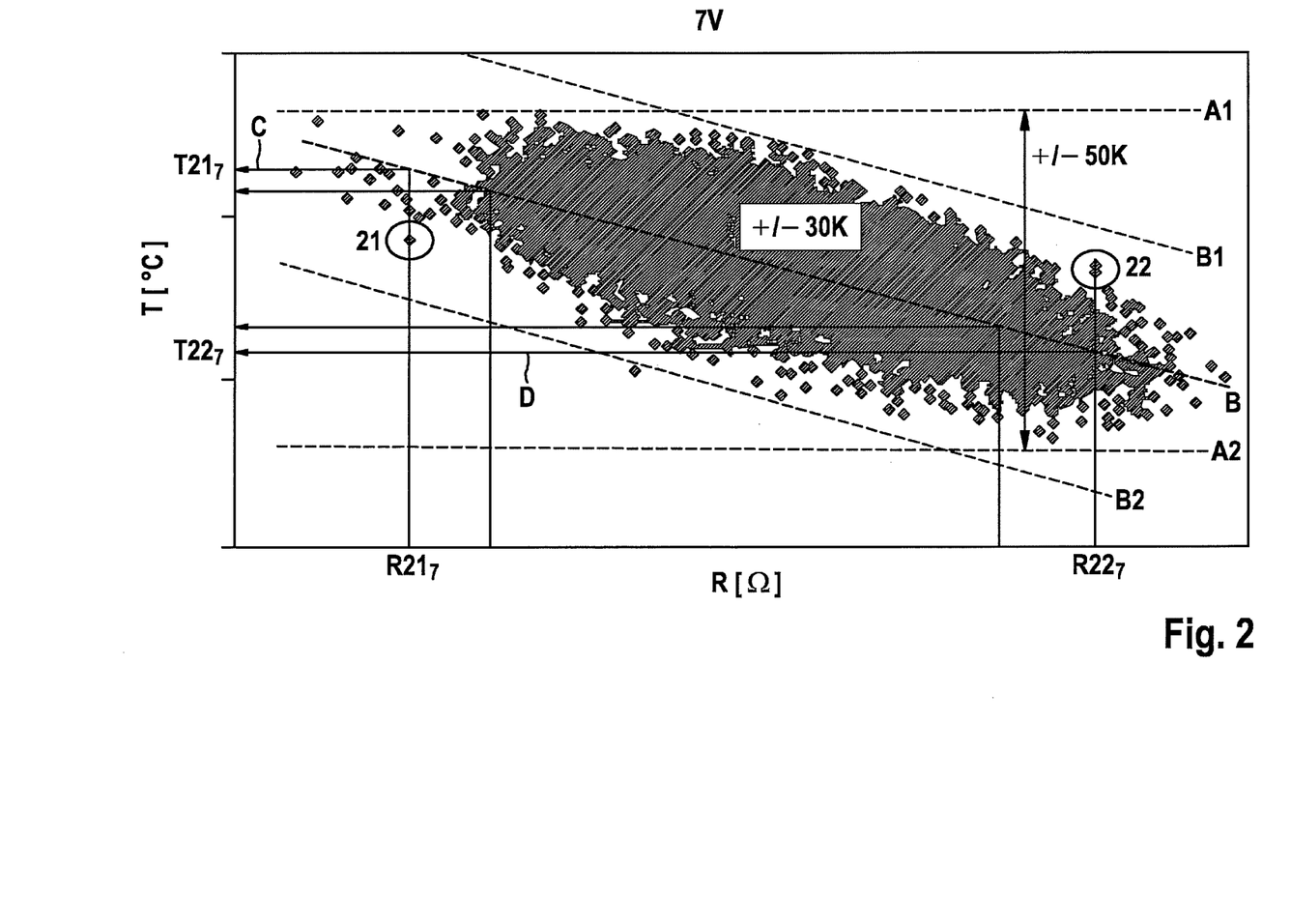
FIG. 2 shows a temperature-resistance pattern of a production lot of sheathed-element glow plugs of one type of sheathed-element glow plug in the case of a nominal voltage of 7 volts.

FIG. 2 shows a cloud of measured values for a multitude of ceramic sheathed-element glow plugs after production, to which a nominal voltage of 7 volts was applied. The individual points characterize the individual sheathed-element glow plugs, the ascertained maximum glow temperature of the sheathed-element glow plugs including a tolerance of 1,200° C.+/−50 K. This tolerance band is represented by lines A1 and A2, which encompass the cloud of measured values of the individual sheathed-element glow plugs.

From this cloud of measured values of the sheathed-element glow plugs, a mean-value curve B is ascertained over sheathed-element-glow-plug resistance R, the temperatures being averaged for the sheathed-element glow plugs having the same resistance. From that, first mean-value curve B is obtained in the form of a straight line. Situated around this mean-value curve B are tolerance bands, which likewise are bounded by straight lines, that have the same gradient as mean-value curve B behaving as a straight line. The tolerance bands therefore run in parallel with a constant width relative to mean-value curve B and are denoted by dashed straight lines B1 and B2. The scatter of the temperature of the individual sheathed-element glow plugs of the production lot around this mean-value curve B as a function of resistance R of the sheathed-element glow plug amounts to only +/−30 K in the case of tolerance bands B1 and B2. This means that after applying the nominal voltage of 7 volts, a resistance R is measured to which, with the aid of this mean-value curve B, a temperature is able to be assigned that, with a tolerance of +/−30 K, represents the maximum temperature of the measured sheathed-element glow plug used. In this context, mean-value curve B forms a temperature-resistance reference correlation.

Figure 3:
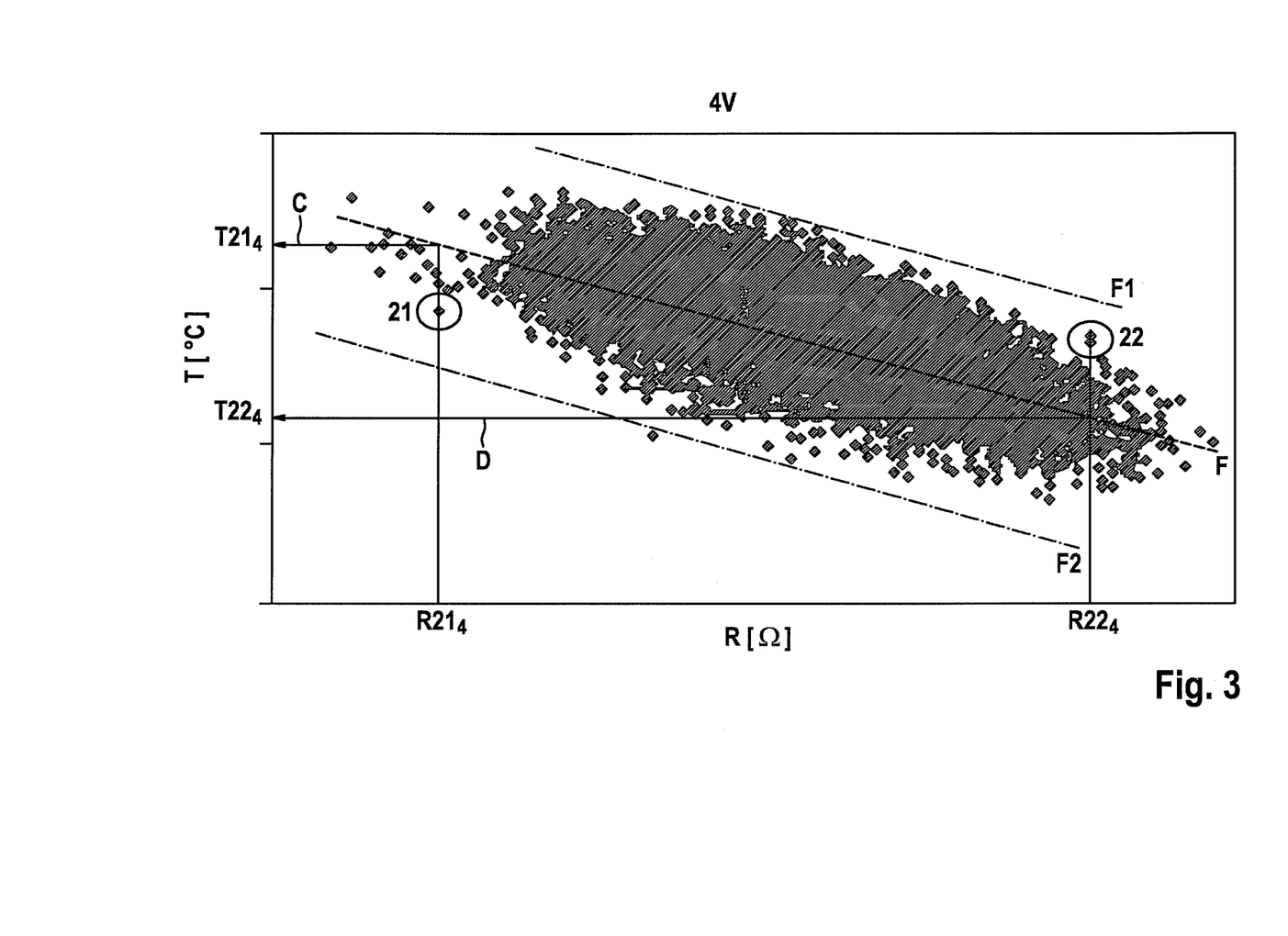
FIG. 3 shows a temperature-resistance pattern of a production lot of sheathed-element glow plugs of the type of sheathed-element glow plug according to FIG. 2 in the case of a nominal voltage of 4 volts.

A second nominal voltage of 4 volts is subsequently applied to the ceramic sheathed-element glow plugs, a second mean-value curve F being determined from the cloud of measured values, which likewise represents a straight line and is encompassed by tolerance band F1, F2. The tolerance of the maximum glow temperature of the glow plug amounts to +/−30 K in the case of this second mean-value curve F, as well After ascertaining the two temperature-resistance reference correlations B, F, in a second step, they are stored permanently one time in memory 12 of glow-time controller 4. At the same time, sheathed-element glow plugs 21 through 24, which were removed from the production lot measured after production, are installed in the internal combustion engine.

After that, a first calibration step of sheathed-element glow plugs 21 through 24 is carried out, which takes place at the end of the vehicle-production line during an after-run of the glow-time controller. Such a running-on always takes place after the internal combustion engine is switched off. In this context, the same interface of the glow-time controller is used as in the activation of the calibration by a shop tester.

With regard to the positioning of this calibration measurement during the after-run, defined and reproducible engine operating states exist here. The frequency of the calibration measurement during the use of the motor vehicle is a function of the number of kilometers traveled by the motor vehicle, the frequency of the glowings of the sheathed-element glow plug which have taken place, the glow intensities of the sheathed-element glow plug and the glow durations of the sheathed-element glow plug. Likewise, this calibration takes place when replacing the sheathed-element glow plug, where it either is activated by a garage tester or autonomously by a function of the glow-time controller which detects the plug replacement.

The calibration step shall now be explained in greater detail using the two sheathed-element glow plugs 21 and 22 selected from the production lot as example. With the aid of a current measurement, glow-time controller 4 ascertains the resistance values corresponding to sheathed-element glow plugs 21 and 22, respectively. Upon applying a first nominal voltage of 7 volts, a resistance $R21_7$ is measured for first sheathed-element glow plug 21, which is represented by point 21 in FIGS. 2 and 3. This resistance $R21_7$ is extended in FIG. 2 to mean-value curve B, and starting from the intersection of resistance value $R21_7$ with this mean-value curve B, associated temperature $T21_7$ of sheathed-element glow plug 21 is ascertained, which is denoted by line C in FIG. 2. This first value pair $R21_7$; $T21_7$ represents a first starting point for generating temperature-resistance correlation II of sheathed-element glow plug 21 specific to the sheathed-element glow plug.

Second sheathed-element glow plug 22 is characterized by point 22 in FIGS. 2 and 3. In the case of this sheathed-element glow plug 22, after applying the nominal voltage of 7 volts, a resistance $R22_7$ is measured. This resistance value $R22_7$ is also shifted to mean-value curve B, and starting from the intersection of mean-value curve B with resistance value $R22_7$, maximum glow temperature $T22_7$ of sheathed-element glow plug 22 is ascertained, which is indicated by line D. This value pair $R22_7$, $T22_7$ is utilized as the starting point for the second temperature-resistance correlation III of second sheathed-element glow plug 22 specific to the sheathed-element glow plug.

In FIG. 3, the temperature-resistance values of the sheathed-element glow plugs of the production lot which were operated at a nominal voltage of 4 volts prior to installation in an internal combustion engine are measured. Because of this lower nominal voltage of 4 V, the resistance and temperature levels lie lower than shown in FIG. 2. If now sheathed-element glow plug 21, which is characterized by point 21, is again selected, then after sheathed-element glow plug 21 has been activated with a nominal voltage of 4 V, a resistance $R21_4$ is determined. This resistance $R21_4$ is shifted to mean-value curve F, and temperature $T21_4$ of sheathed-element glow plug 21 belonging to the intersection is ascertained, which is denoted by line C. From value pair ($R21_4$; $T21_4$) determined at the nominal voltage of 4 V and value pair ($R21_7$; $T21_7$) ascertained for the nominal voltage of 7 V, the first temperature-resistance correlation specific to the sheathed-element glow plug is determined for sheathed-element glow plug 21 in the form of straight line II, as shown in FIG. 4.

In the case of sheathed-element glow plug 22, which is represented in point 22, a resistance $R22_4$ is measured in response to activation of sheathed-element glow plug 22 with a nominal voltage of 4 V. With the aid of second mean-value curve F, this resistance $R22_4$ yields a temperature $T22_4$ of sheathed-element glow plug 22 (line D). Value pairs ($R22_4$; $T22_4$) and ($R22_7$; $T22_7$) permit the construction of the second temperature-resistance correlation, specific to the sheathed-element glow plug, for second sheathed-element glow plug 22, as represented in the form of straight line III in FIG. 4.

Figure 4:
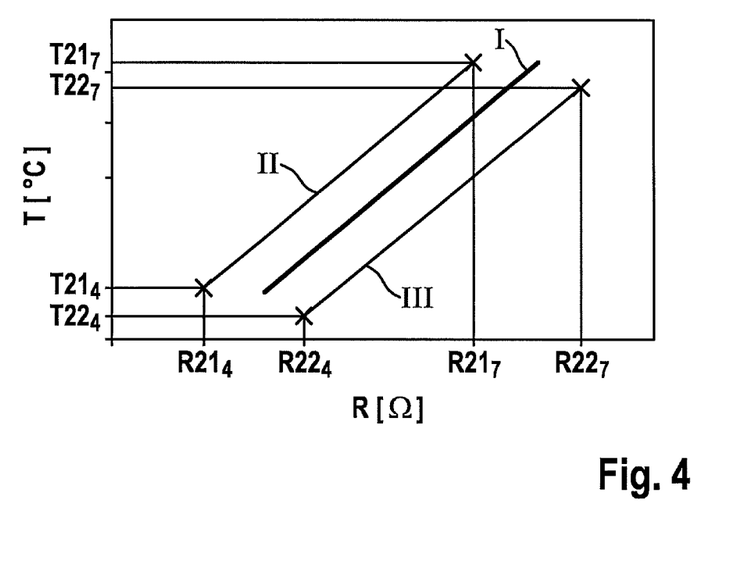
FIG. 4 shows a temperature-resistance correlation, specific to the sheathed-element glow plug, of individual sheathed-element glow plugs.

From this it follows that when any voltage at all is applied to a sheathed-element glow plug 21, 22 installed in the internal combustion engine, from the temperature-resistance reference correlations in the form of reference-value curves B, F, the maximum glow temperature of sheathed-element glow plugs 21, 22 may be determined, from which the resistance-temperature correlation specific to the sheathed-element glow plug is ascertained for each sheathed-element glow plug 21, 22, as shown in FIG. 4. FIG. 4 shows glow-plug-specific temperature-resistance correlation I for what is termed a "mean-value plug", which corresponds to a sheathed-element glow plug whose temperature-resistance values at a nominal voltage of 7 V lie on mean-value curve B, and at a nominal voltage of 4 V, lie on mean-value curve F. In the use of glow-plug-specific temperature-resistance correlation I of this "mean-value plug", a tolerance of the maximum temperature of +/−50 K is assumed.

However, as already explained, if resistance R of a sheathed-element glow plug 21, 22 is measured at 7 V and at 4 V and each of these resistance values is assigned a temperature value which was determined with the aid of mean-value curve B or F, value pairs are formed from which a temperature-resistance straight line specific to the sheathed-element glow plug is determined for respective sheathed-element glow plug 21, 22 in question. However, the fluctuations to be anticipated around this straight line amount to only +/−30 K. The maximum temperature of sheathed-element glow plugs 21, 22 may thereby be applied with 1,220° C. in glow-time controller 4, and therefore higher than in the related art, since with the maximum tolerance of +/−30 K, the permissible maximum temperature of 1,250° C. is not exceeded.

These temperature-resistance correlations (straight line II and straight line III) specific to the sheathed-element glow plug are stored in memory 12 of glow-time controller 4. During the operation of sheathed-element glow plugs 21, 22 in the internal combustion engine, a voltage which is to be applied to respective sheathed-element glow plugs 21, 22 to attain a voltage setpoint value, is subjected to an open-loop or closed-loop control. The knowledge of the maximum glow temperature of each sheathed-element glow plug 21, 22 is necessary for the open-loop or closed-loop control. This maximum glow temperature is ascertained on the basis of the resistance measured at the respective sheathed-element glow plug, from stored temperature-resistance correlation II or III specific to the sheathed-element glow plug, belonging to sheathed-element glow plug 21, 22.

The calibration step may be repeated cyclically in order to take the aging of sheathed-element glow plug 21, 22 in the internal combustion engine into account.

As an alternative, however, this sequence described in connection with glow-time controller 4 may also be carried out by engine control unit 7, memory 12 being disposed in engine control unit 7.

It should be pointed out that the measurement of the resistances after applying the nominal voltage of 4 V or 7 V is first carried out when a steady temperature distribution has set in within sheathed-element glow plug 21, 22 used.

On the basis of the present invention, the tolerance range of the sheathed-element glow plug installed in the motor vehicle is restricted. A higher maximum temperature of the sheathed-element glow plug may thus be applied for the open-loop or closed-loop control of the sheathed-element glow plug in glow-time controller 4 or engine control unit 7. Improved starting performance and quieter engine idling may be attained owing to the increased maximum temperature of the sheathed-element glow plug, with a decrease in emissions being ensured.

What is claimed is:

1. A method for determining a temperature of a sheathed-element glow plug during an operation in an internal combustion engine, comprising:
    after the sheathed-element glow plug has been installed in the internal combustion engine, performing a calibration step in which, with an aid of a predetermined temperature-resistance reference correlation, a temperature-resistance correlation specific to the sheathed-element glow plug is ascertained;
    during the calibration step, upon applying a first voltage to the sheathed-element glow plug,
        ascertaining a first resistance of the sheathed-element glow plug;
        assigning to the first resistance a first temperature from a first temperature-resistance reference correlation, wherein the first resistance and the first temperature correspond to a first temperature-resistance value pair; and
        forming the temperature-resistance correlation specific to the sheathed-element glow plug from the first temperature-resistance value pair; and
    upon applying a second voltage to the sheathed-element glow plug,
        ascertaining a second resistance of the sheathed-element glow plug;
        assigning to the second resistance a second temperature from a second temperature-resistance reference correlation, wherein the second resistance and the second temperature correspond to a second temperature-resistance value pair; and
        forming the temperature-resistance correlation specific to the sheathed-element glow plug from the first temperature-resistance value pair, as well as from the second temperature-resistance value pair; and
    from the temperature-resistance correlation, determining a temperature of the sheathed-element glow plug during operation of the sheathed-element glow plug in the internal combustion engine.

2. The method as recited in claim 1, further comprising: determining the temperature-resistance reference correlation as a mean value over a sheathed-element glow plug resistance, from a plurality of sheathed-element glow plugs of one type of sheathed-element glow plug having different manufacturing tolerances, after their production.

3. The method as recited in claim 2, further comprising: forming the temperature-resistance reference correlation as a reference characteristic curve provided with a tolerance band that has the same gradient as the reference characteristic curve.

4. The method as recited in claim 3, wherein the reference characteristic curve is a reference straight line.

5. The method as recited in claim 3, further comprising: ascertaining and storing the temperature-resistance reference correlation one time for each type of sheathed-element glow plug.

6. The method as recited in claim 1, wherein the calibration step of the sheathed-element glow plug is carried out in an end-of-line production of a motor vehicle.

7. The method as recited in claim 1, wherein the calibration step is carried out in an after-run phase of a control unit controlling the internal combustion engine in at least one of an open loop and a closed loop.

8. The method as recited in claim 7, further comprising repeating the calibration step a multiple number of times.

9. The method as recited in claim 7, further comprising: repeating a frequency with which the calibration step is repeated as a function of at least one of a number of glowings which have taken place, glow intensities, and a glow duration of a sheathed-element glow plug.

10. The method as recited in claim 7, wherein the calibration step is carried out after the sheathed-element glow plug has been replaced.

11. The method as recited in claim 1, further comprising: measuring the first resistance and the second resistance after a formation of a steady temperature profile within the sheathed-element glow plug after applying the first voltage and the second voltage, respectively.

12. A device for determining a temperature of a sheathed-element glow plug during operation in an internal combustion engine, comprising:
    a memory unit storing a first temperature-resistance correlation;
    a current-measuring device that transmits one or more current signals; and
    a processing unit connected to the memory unit and the current-measuring device, wherein after the sheathed-element glow plug has been installed in the internal combustion engine, the processing unit carries out a calibration step in which, with an aid of the first temperature-resistance reference correlation determined prior to installation of the sheathed-element glow plug in the internal combustion engine, a temperature-resistance correlation specific to the sheathed-element glow plug is ascertained, and from the temperature-resistance correlation specific to the sheathed-element glow plug and stored in the memory unit, the processing unit determines a temperature of the sheathed-element glow plug during operation of the sheathed-element glow plug in the internal combustion engine, wherein, during the calibration step, the processing unit applies a first voltage and a second voltage to the sheathed-element glow plug, and wherein the processing unit determines a first resistance value of the sheathed-element glow plug from a first current signal corresponding to the first voltage and determines a second resistance value of the sheathed-element glow plug from a second current signal corresponding to the second voltage.

13. The device as recited in claim 12, wherein:

from the first current signal, the processing unit assigns a first temperature value from the stored first temperature-resistance reference correlation to the first resistance value to form a first temperature-resistance value pair, from the second current signal the processing unit assigns a second temperature value from a stored second temperature-resistance reference correlation to the second resistance value to form a second temperature-resistance value pair, and the processing unit determines the temperature-resistance correlation specific to the sheathed-element glow plug from the first temperature-resistance value pair and the second temperature-resistance value pair.

\* \* \* \* \*